July 26, 1927.
W. G. HAWLEY
1,637,311
METHOD OF TREATING MILK POWDER AND PRODUCT PRODUCED THEREBY
Filed Jan. 29, 1927
2 Sheets-Sheet 2
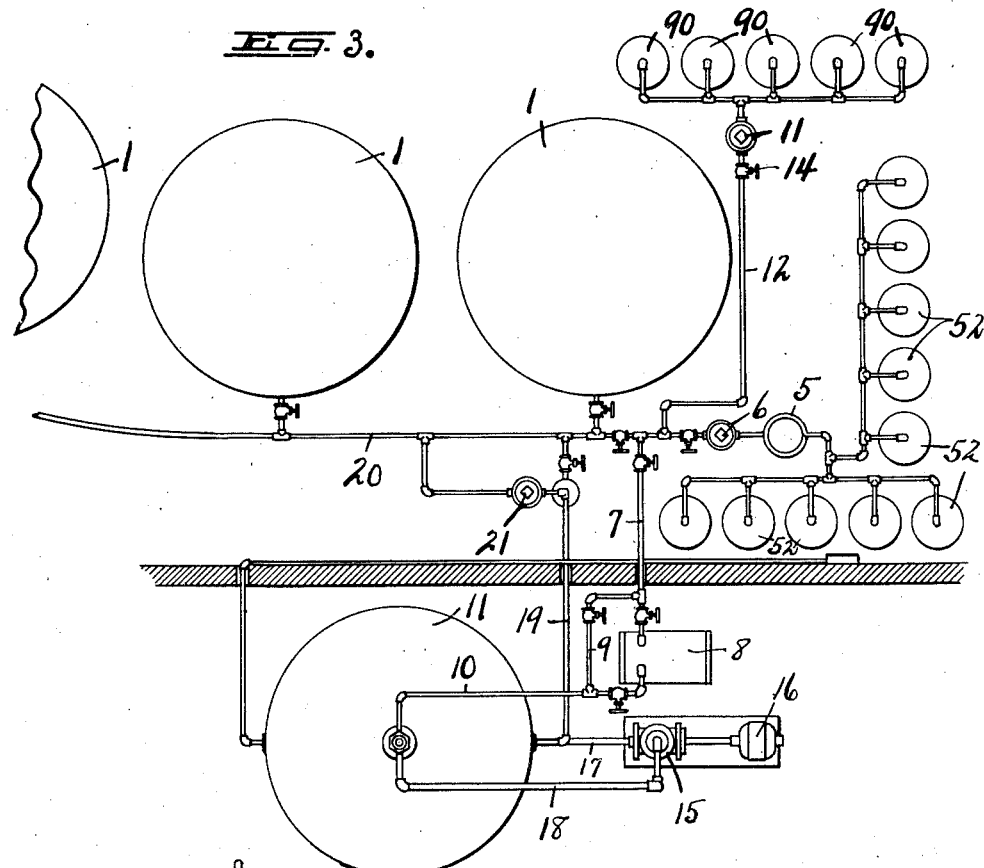
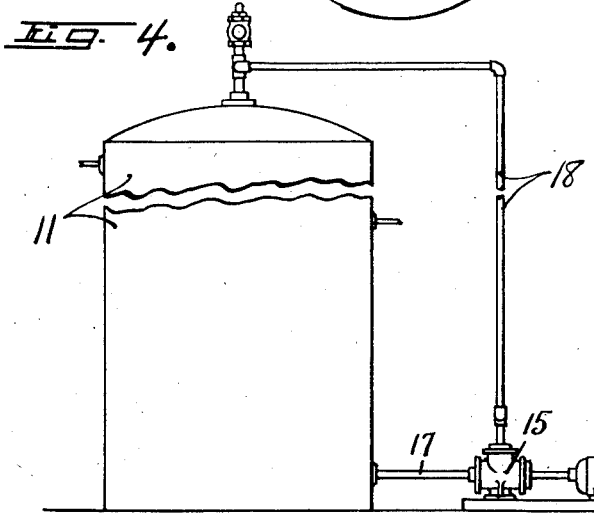
WITNESS
INVENTOR.
W. G. Hawley
BY
ATTORNEYS.

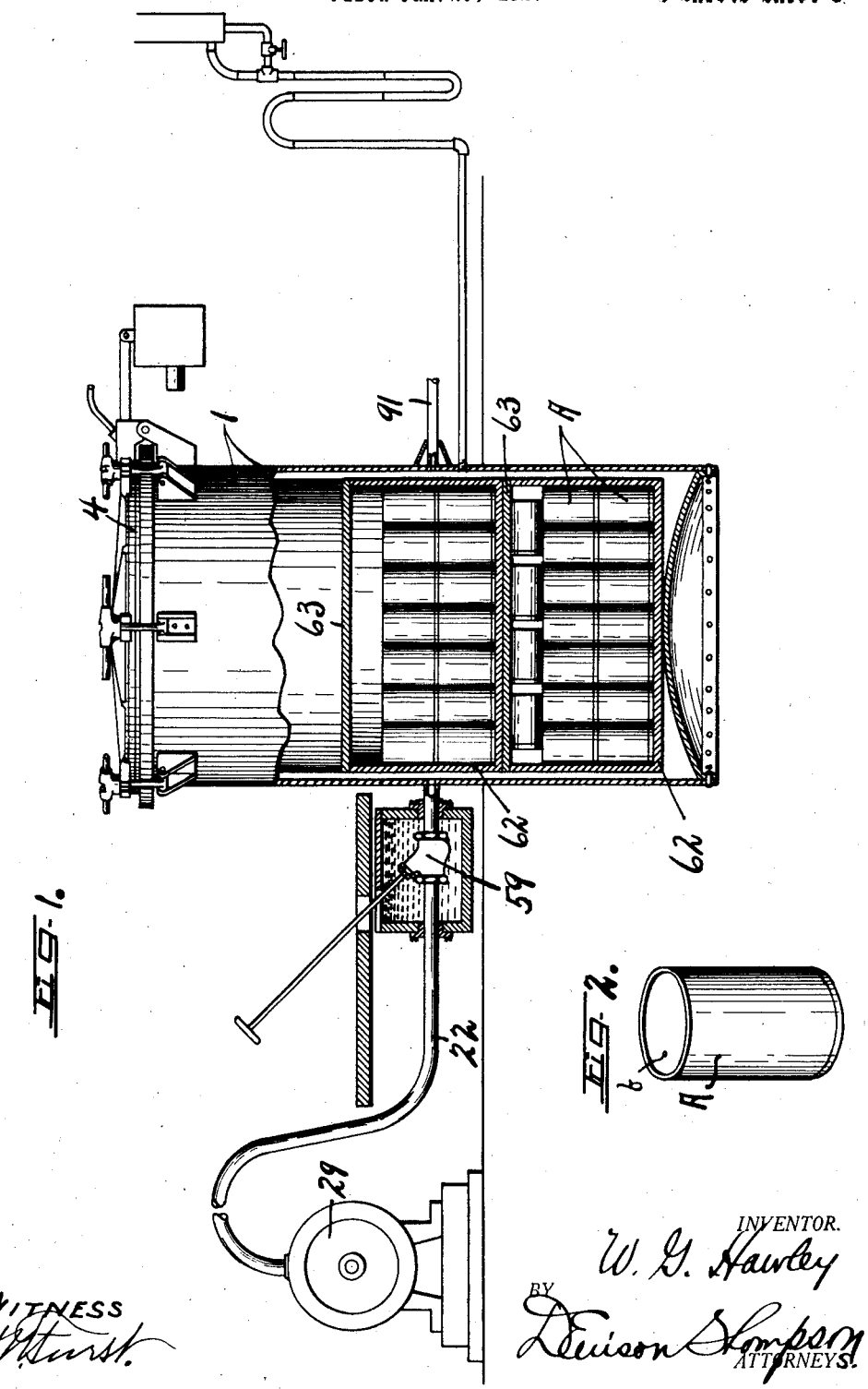

Patented July 26, 1927.

1,637,311

UNITED STATES PATENT OFFICE.

WILLIAM GERE HAWLEY, OF SYRACUSE, NEW YORK, ASSIGNOR TO MERRELL-SOULE COMPANY, OF SYRACUSE, NEW YORK, A CORPORATION OF NEW YORK.

METHOD OF TREATING MILK POWDER AND PRODUCT PRODUCED THEREBY.

Application filed January 29, 1927. Serial No. 164,513.

This invention relates to a new and improved method of treating milk powder, and to the new product or article of commerce produced thereby.

Heretofore milk powder, particularly milk powder containing butter-fat, as whole-milk powder, or cream powder, has been of quite limited keeping quality, and altho packed in air-tight containers would, after a few months, develop a tallowy flavor, due doubtless to oxidization of the butter fat as a result of the fact that the enclosing receptacle or can contains considerable free or uncombined oxygen, not only oxygen present in the air around the particles of the powder, but also free or uncombined oxygen contained in or adhered to the particles of the powder.

By the expression "free or uncombined oxygen" as used in the specification and claims hereof, I mean the element oxygen consisting of two atoms of oxygen, and being the molecular form $O_2$ contained in air, and I do not mean to include the oxygen chemically combined with the elements in the various constituents of the milk-powder.

The main object of this invention is the production of a milk powder product, or article of commerce particularly a milk-powder product, which altho containing substantial quantities of butter-fat, will keep for long periods of time without developing a tallowy or rancid flavor, and by the use of a combination of gases that do not contain free or uncombined oxygen, the proportions of the two gases in the combination being regulated so that any pre-determined desired degree of vacuum will result within the container, due to absorption of the gas or gases by the powder.

For the purposes of this application, gases suitable for use in connection with the invention herein are separated into two distinct classes, viz: "absorbed gases" and "non-absorbed gases". The following gases may be set forth as illustrative of those herein termed "absorbed gases" and such gases in general have an acid or alkaline re-action when dissolved in water:—Carbon-dioxide, hydrogen-sulfide, ammonia, and sulphur dioxide.

It is found that the rate and degree of absorption of these "absorbed gases" is approximately proportional to the solubility of these gases in water.

The following may be set forth as illustrative of what are herein termed "non-absorbed gases" and in general are neutral gases: Nitrogen, hydrogen and methane.

It is found that the solubility of these "non-absorbed" gases in water is relatively low and they are absorbed by milk powder only to a limited degree.

For the purpose of a specific disclosure, carbon dioxide will hereafter be referred to as representative of "absorbed gases" and nitrogen will be referred to as illustrative of "non-absorbed gases".

It is found that when cans filled with milk powder are charged with an "absorbed gas", such as carbon dioxide, and then sealed at substantially atmospheric pressure, that the powder absorbs sufficient of the carbon-dioxide so as to produce within the cans a vacuum of from five to eight inches of mercury when the cans have been allowed to stand for about seven days, and that this vacuum later increases to approximately eleven to fifteen inches of mercury after a longer period of time, which acts to draw in the ends and perhaps the sides of the can, in many cases to an undesirable and injurious extent.

It is also found that when a "non-absorbed" gas such as nitrogen is used, it is absorbed to a very slight extent, if at all, by the powder, and as a result, the ends of the cans are not drawn in to an extent sufficient to permit their deformation to be utilized as a test to determine whether or not the can leaks.

For these reasons both gases, when used alone, have marked disadvantages, and I have found that by utilizing a combination of an "absorbed" gas and a "non-absorbed" gas in predetermined proportions dependent upon the amount of vacuum which it is desired to ultimately produce in the can, that an improved article can be produced in which the vacuum is sufficient to permit the use of the same as a test for leakers, but it is not sufficient to injure the cans or materially affect their appearance.

It is found that the free or uncombined oxygen content of cans adapted to contain the milk powder is about 75 cubic centimeters of oxygen for each pound of powder. When all of the air in the space around the powder is removed down to a pressure of one or two millimeters of mercury, there still remains adhered to or contained in the powder seven or eight cubic centimeters of free or uncombined oxygen (measured under standard conditions) and this amount of free or uncombined oxygen contained in or adhered to the powder is sufficient in itself to cause development of the tallowy flavor referred to.

Further, ordinary air has about 21% oxygen, whereas the air contained in or adhered to the powder has approximately 35% oxygen, showing that milk-powder is selective in its absorption of the gases of the air, and its absorption co-efficient is higher for oxygen than nitrogen, so that the contained air is richer in oxygen than ordinary air, and therefore, more harmful.

For these reasons it is therefore essential that a portion of this contained or adhered oxygen be removed from the powder if the desired keeping quality is to be attained, and it is found that the free or uncombined oxygen included with each pound of powder should be reduced below 5 cubic centimeters per pound if a product having the desired keeping qualities is to be produced.

It is further found that the oxygen adhered to or contained in the powder cannot be removed by merely drawing a vacuum upon the powder, even tho that vacuum be a substantially perfect one, and it is necessary in reducing the free or uncombined oxygen content below the limit stated that the milk powder be maintained under a vacuum or surrounded by a gas that is a vacuum for free or uncombined oxygen for a considerable period of time, for illustration, 20 hours, during which time the adhered or contained free or uncombined oxygen is slowly given up by the powder, and the retained free or uncombined oxygen is thereby reduced in amount below the limit stated.

Further, it is found that most advantageous results are obtained when the method is carried on with milk powder packed in air-tight containers which have a vent-hole of extremely small area, not greater than .0002 and preferably approaching .00006 sq. inch for each pound of powder the container is adapted to hold, whereby the container may be sealed at atmospheric pressure, while the cans are still giving off gas through the vent-hole to prevent ingress of air to the container.

By means of the process described herein, the free or uncombined oxygen in each one pound of powder may be reduced below five cubic centimeters (measured under standard conditions) and preferably down to about 3.5 cubic centimeters per pound of powder, whereby development of the tallowy flavor is eliminated and further, whereby the requisite air-tightness of the receptacle may easily be determined by reason of a vacuum developed in the container through absorption of gases by the powder enclosed in an air-tight container, and without the production of sufficient vacuum to injure the cans or containers, and I have produced such a product and have already kept such product without the development of a tallowy flavor for a considerable period of time.

Other objects and advantages relate to the details of the process and the detailed characteristics of the product, all as will more fully appear from the following description, taken in connection with the accompanying drawings, in which:

Figure 1 is an elevation partially in section and partially diagrammatic, of an apparatus capable of use in carrying out the process herein.

Figure 2 is an elevation of the article of commerce produced by the utilization of the process set forth herein.

Figure 3 is a top plan of a gas mixing apparatus.

Figure 4 is an elevation of a mixing tank.

The method of this invention as carried out in connection with the apparatus as shown, may be described substantially as follows:

The milk powder which it is desired to package is first placed in a suitable can or container A. Usually these cans come with separate covers, and the covers are provided with a vent-hole —b— having a cross-sectional area of from .00006 to .0002 sq. inch per pound of powder the can is adapted to contain, i. e., we are assuming that the cans are substantially filled with powder.

The cans are sealed with these covers, and are then placed in baskets 62 as best illustrated in Figure 1. These baskets may contain any suitable number of cans, dependent upon their size, and the amount of powder which each can is adapted to contain. As at present used, each basket is adapted to contain approximately 400 one-pound cans. Each basket 62 is provided with a loose cover 63 that is rested upon the upper edge of the basket, as illustrated in Figure 1, and does not form an air-tight joint with the body of the basket. Any number of these baskets may be placed in one of the tanks 1 and as at present used, the size of the tanks 1 is sufficient to accommodate three baskets stacked one upon the other, and each is equipped with a loose cover —63—.

The tank —1— is then sealed absolutely air-tight by means of the cover —4— and is then connected to the vacuum pump —29— by means of the pipe —22—. The vacuum pump —29— is then started and the valve —59— to the tank is gradually opened, drawing vacuum at a speed of approximately 6 inches of mercury per minute. When the vacuum has reached about twenty-seven inches, the valve —59— is opened wide. At the end of fifteen minutes the remaining pressure in the tank —1— is about one millimeter of mercury, the valve —59— is then closed, and the tank with the enclosed baskets and cans is allowed to stand 20 hours, during which time the powder gives off a portion of its contained or absorbed oxygen, or perhaps preferably the tank —1— which has been evacuated, is charged with a gas that does not, or a combination of gases that do not contain free or uncombined oxygen preferably up to a pressure of about two pounds per square inch.

This charging as at present carried on, requires about six minutes.

The tank so charged and with its enclosing the baskets —62— is allowed to stand about twenty hours, during which time the pressure of the gas or gases used may gradually decrease from about two pounds to the square inch down to about one-half pound per square inch, the final pressure varying somewhat with temperature and barometric pressure.

At the end of the 20 hour period of treatment under either condition, the tank —1— is again connected to the vacuum pump —29— under control of valve —59—, and the tank is again evacuated, and the pressure will again be reduced to about one millimeter of mercury, and the free or uncombined oxygen content is reduced by this operation to approximately 3.5 cubic centimeters for each pound of powder, which condition is below the limit required for producing the desired keeping quality of the powder, and eliminating the development of a tallowy flavor.

The communication with the vacuum pump is then cut off and a combination of an "absorbed" gas and a "non-absorbed" gas is allowed to enter the tank —1—.

Figures 3 and 4 illustrate a special form of apparatus for effecting the desired mixing of a combination of the "absorbed" and "non-absorbed" gases in the desired proportions. The tanks —90— illustrated in Figure 3 may contain a "non-absorbed" gas, such as nitrogen under pressure, and the tanks —52— may contain an "absorbed" gas under pressure, such as carbon dioxide. The carbon dioxide may flow from any one of the tanks —52— through the heating coil —5—, reducing valve —6—, and pipe —7— to the pump —8— if desired, when the pressure in the carbon dioxide tanks is low, or through pipe —9— to the pipe —10— communicating with the upper portion of a mixing tank —11—.

In like manner, the "non-absorbed" gas may flow from any one of the tanks —90— through reducing valve —11—, pipe —12—, to the pipe —7— and either to the pump —8— or through pipes —9— and —10— direct to the mixing tank.

In order to produce a mixture of predetermined proportions it may be desirable to first let the absorbed gas flow into the mixing tank —11— until a pressure of, for instance, 50 pounds is reached, then close valve —13—, open valve —14— and permit the "non-absorbed" gas to flow into the mixing tank —11— until a pressure of one hundred pounds is reached, at which time it will be apparent that the gases will be mixed in substantially equal proportions. In view of the fact that one gas may be heavier than the other, means is provided for causing a continuous circulation of the gases through the tank, and an external circulating system, in order to effect thorough mixing of the gases.

This circulating system may include a pump —15— of any suitable form and driven in any suitable way, as by motor —16— having its low pressure side connected by pipe —17— to the lower portion of the mixing tank —11— and its high pressure side connected as by pipe —18— to the upper portion of the mixing tank —11—.

When the proper amount and proportions of the gases have been supplied to the mixing tank —11—, the pump —15— may be put in operation to circulate the gases and uniformly mix them. The mixing tank —11— is adapted to be connected as by pipe —19— with a header pipe —20— adapted to be brought into communication with any one of the process tanks —1—, reducing valve —21— being provided for use, if desired. In addition, either one of the sets of tanks may, by opening suitable valve, be brought into direct communication with the process tanks —1—.

By this apparatus and process, a thorough and uniform mixing of two gases in any desired proportions can be effected and can be supplied to the process tanks —1— under desired pressure.

This charging of the process tanks —1— up to a pressure of, for instance, 10 pounds per square inch, super-saturates the surface of the particles of the powder with the gases, thereby causing a slow stream of the gases to escape through the minute vents in the cans for about the first half hour after the pressure has been released, whereby during the period of time necessary to the sealing of the vent holes as by solder, ingress of air through the vent holes to the interior of the cans is prevented.

Preferably a tank charged with the combined gases to a pressure of substantially ten pounds per square inch, is allowed to stand about thirty minutes, and the pressure is then gradually relieved, discharging the gas into the atmosphere.

This operation requires about two or three minutes in order to get down to atmospheric pressure. When atmospheric pressure is reached in the tank —1—, the cover —4— is removed and the baskets are then taken out of the tank and the vent holes in the cans closed with solder as soon as possible, preferably within thirty minutes, during which period entry of oxygen to the cans is not permitted for the reason that the cans are giving off the gases through the vent-holes.

The article of commerce so produced consists of an air-tight container charged with a combination of an "absorbed" gas, such as carbon-dioxide and a "non-absorbed" gas such as nitrogen, and enclosing milk powder in which the free or uncombined oxygen content is below five cubic centimeters (measured under standard conditions) for each contained pound of milk powder, whereby a milk powder product, particularly one containing butter-fat is produced having excellent keeping qualities, while at the same time the vacuum produced within the cans can be regulated to any desired degree permitting its use as a test for leakers without injuring or deforming the cans to an undesirable extent.

The cans of powder when the vent-holes have been soldered should be left standing for some days, preferably at least seven days, during which time sufficient of the gas will be absorbed by the powder to produce a substantially pre-determined vacuum which will draw in the ends of the cans to the extent necessary for testing purposes, and the cans may then be tested in any suitable manner, as by an electric bell tester which causes a bell to ring if the bottom end depressions do not exceed a certain set distance, and in this manner, the leaking cans can be sorted out, as it is essential to the keeping qualities of this article of manufacture that the cans be air-tight.

The essential feature of this invention resides in the utilization of a combination of an "absorbed" and a "non-absorbed" gas in suitable proportions so as to produce within the cans of powder a substantially pre-determined vacuum sufficient in extent to constitute a test for leakers, but not sufficient to injure the article, and being vacuum greater than would be produced by the use of nitrogen alone, and less than would be produced by the use of carbon-dioxide alone.

I claim:

1. The process of packing milk powder comprising enclosing milk powder in a container air-tight except for a minute opening, subjecting the milk powder in the container to high vacuum conditions, and then charging the container with a combination of carbon dioxide and nitrogen.

2. The process of packing milk powder comprising enclosing the milk powder in a container air-tight except for an opening having an area not greater than .0002 sq. inch per pound of milk powder, subjecting the milk powder in the container to high vacuum conditions, and then charging the container with a combination of carbon dioxide and nitrogen.

3. The process of packing milk powder comprising enclosing milk powder in a container air-tight except for a minute opening, subjecting the milk powder in the container to high vacuum conditions, then holding the milk powder in the absence of free or uncombined oxygen for a sufficient period of time to reduce its free or uncombined oxygen content below five cubic centimeters for each pound of powder, and then charging the container with a combination of carbon dioxide and nitrogen.

4. The process of packing milk powder comprising enclosing the milk powder in a container air-tight except for an opening having an area not greater than .0002 sq. inch per pound of milk powder, subjecting the milk powder in the container to high vacuum conditions, then holding the milk powder in the absence of free or uncombined oxygen for a sufficient period of time to reduce its free or uncombined oxygen content below five cubic centimeters for each pound of powder, and then charging the container with a combination of carbon dioxide and nitrogen.

5. An article of commerce consisting of an air-tight container, milk powder within the container having a free and uncombined oxygen content of less than five cubic centimeters per pound of powder, and a combination of carbon dioxide and nitrogen within the container.

6. An article of commerce consisting of an air-tight container, milk powder within the container, and a combination of carbon dioxide and nitrogen within the container.

7. The process of packing milk powder comprising enclosing the milk-powder in an atmosphere comprising a mixture of an absorbed and non-absorbed gas.

8. The process of packing milk powder comprising removing all the oxygen down to at least 5 cubic centimeters per pound of the product from the containing tin, and placing a mixture of an absorbed and a non-absorbed gas in the place formerly occupied by the oxygen in the tin.

9. An article of commerce consisting of an air-tight container, milk powder within the container, and a combination of an absorbed and a non-absorbed gas within the container.

10. An article of commerce consisting of an air-tight container, milk powder within the container, the uncombined oxygen content of the powder and space within the container being less than five cubic centimeters per pound of powder, and a combination of carbon-dioxide and nitrogen within the container.

In witness whereof I have hereunto set my hand this 18th day of January, 1927.

W. GERE HAWLEY.